(No Model.)
E. O. BRYDEN.
WRIST PIN.
No. 550,214. Patented Nov. 19, 1895.
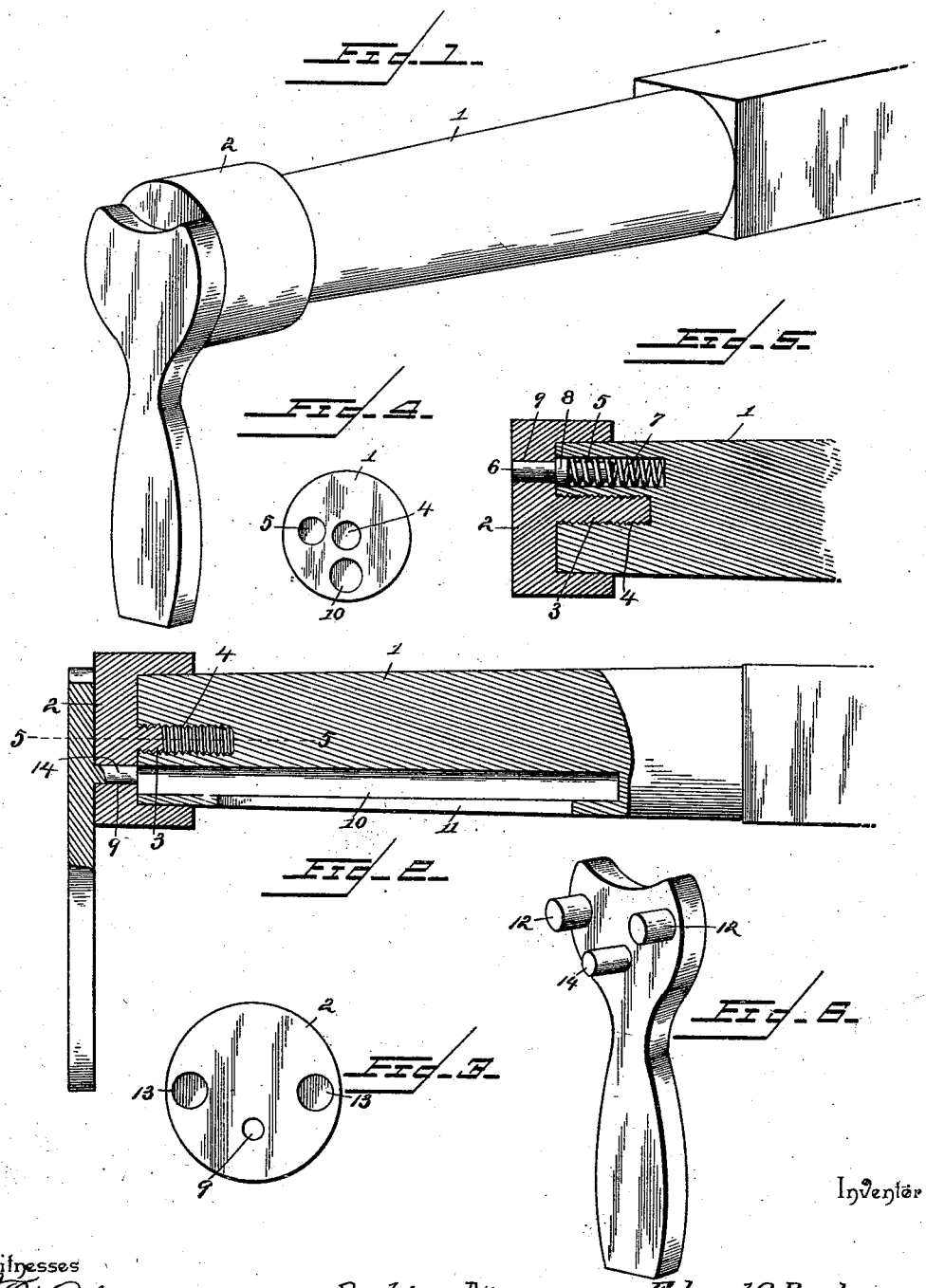
Witnesses
By his Attorneys,
Inventor
Edward O. Bryden.

UNITED STATES PATENT OFFICE.

EDWARD O. BRYDEN, OF LAFAYETTE, INDIANA, ASSIGNOR OF ONE-HALF TO W. F. COMBS, OF RENO CITY, OKLAHOMA TERRITORY.

WRIST-PIN.

SPECIFICATION forming part of Letters Patent No. 550,214, dated November 19, 1895.

Application filed July 9, 1895. Serial No. 555,398. (No model.)

*To all whom it may concern:*

Be it known that I, EDWARD O. BRYDEN, a citizen of the United States, residing at Lafayette, in the county of Tippecanoe and State of Indiana, have invented a new and useful Wrist-Pin, of which the following is a specification.

My invention relates to wrist or crank pins for mowing, binding, and similar machines, and has for its object to provide simple and efficient means for locking the cap or nut upon the outer end of the pin and for applying a lubricant to the pin without removing the cap or nut.

Further objects and advantages of this invention will appear in the following description and the novel features thereof will be particularly pointed out in the appended claims.

In the drawings, Figure 1 is a perspective view of a wrist or crank pin constructed in accordance with my invention, a wrench being applied thereto in the operative position. Fig. 2 is a longitudinal section of the same. Fig. 3 is a face view of the cap or nut. Fig. 4 is an end view of the spindle. Fig. 5 is a partial sectional view of the spindle with the wrench removed and the locking-pin in its operative position, the plane of said section being indicated by the line 5 5 of Fig. 2. Fig. 6 is a detail view of the wrench.

Similar numerals of reference indicate corresponding parts in all the figures of the drawings.

1 designates a pin provided with a cap or nut 2, having a central threaded stem 3, which engages an axial bore 4 of the pin. Mounted in a socket 5, eccentric with the pin, is a locking-bolt 6, provided with an actuating-spring 7, said bolt being provided with a shoulder 8 to limit its outward projection by contact with the inner surface of the cap or nut when the body portion of the bolt is in engagement with an opening 9, formed in said cap or nut for its reception. Also formed eccentric with the pin, with its opening at the extremity thereof, is an oil cup or channel 10, extending parallel with the axis of the spindle and provided at the side of the spindle with an outlet opening or slot 11 to allow the contents of the oil-cup to flow radially outward to the surface of the spindle, the distance of the locking-opening 9 from the axis of the cap or nut (the latter being coaxial with the pin) being the same as the distance between the axis of the pin and the socket for the locking-bolt, and the distance between the axis of the pin and the center of the oil cup or channel being in excess of the distance between the axis of the cap or nut and the locking-opening 9, whereby when the cap or nut is turned to open communication between the opening 9 and the oil cup or channel said opening 9 communicates with the oil cup or channel only at the inner side of the latter or the side contiguous to the axis of the pin. Furthermore, the oil cup or channel is of larger diameter than the locking-opening 9, and hence only a portion of its outer end is exposed when the cap or nut is in the position shown in Fig. 2, to provide for introducing oil until the oil cup or channel is practically full without allowing the oil to escape or overflow.

The wrench which is employed in connection with the improved wrist-pin is provided with studs 12 to engage countersunk sockets or depressions 13 in the outer surfaces of the cap or nut and a bolt-repressing pin 14 to extend through the opening 9 and repress the locking-bolt sufficiently to allow the cap or nut to be turned. By means of this wrench the cap or nut may be turned to cause the registration of the opening 9 with either the bolt-socket or the oil cup or channel to provide for locking the cap or nut or exposing said oil cup or channel for the admission of a lubricant to the journal.

By the above-described construction the journal may be readily oiled, and by turning the cap or nut backward or in the direction of unscrewing through an arc equal to the interval between the center of the bolt-socket and the center of the oil cup or channel, and after the introduction of the lubricating material, the cap or nut may be returned to its normal position to allow the engagement of the locking-opening by the bolt to prevent the cap or nut from being loosened by jarring and thus accidentally displaced.

Various changes in the form, proportion, and the minor details of construction may be resorted to without departing from the spirit or sacrificing any of the advantages of this invention.

Having described my invention, what I claim is—

1. The combination of a journal-pin provided at its extremity with an eccentric socket, a spring-actuated locking bolt mounted in said socket and adapted to operate in a direction parallel with the axis of the pin, and a cap or nut threaded upon the extremity of the pin and provided with an eccentric locking opening accessible from the outer side of the cap or nut and adapted to be arranged in registration with said socket in the pin for engagement by the locking bolt, substantially as specified.

2. The combination of a journal-pin provided at its extremity with an eccentric locking bolt adapted to operate parallel with the axis of the pin and also provided with an oil cup or channel having its inlet end at the extremity of the pin and an outlet at the side of the pin, and a cap or nut threaded upon the pin and provided with an opening accessible from the outer side of the cap or nut and adapted to register in different positions of the cap or nut with either the locking bolt or said oil cup, substantially as specified.

3. The combination of a journal-pin provided at its extremity with a locking bolt mounted to move parallel with the axis of the pin and also provided with an oil cup or channel having its inlet end at the extremity of the pin and spaced from the axis of the pin a distance in excess of the axis of said locking bolt, the oil cup or channel having an outlet at the side of the pin, and a cap or nut threaded upon the pin and provided with an opening spaced from the axis of the cap or nut a distance equal to the interval between the axis of the pin and the center of the locking bolt, whereby when the cap or nut is turned to open communication between the opening therein and the oil cup or channel only a portion of the inlet end of the oil cup or channel is exposed, substantially as specified.

4. The combination of a journal-pin provided at its extremity with a locking bolt mounted to move parallel with the axis of the pin and also provided with an oil cup or channel having its inlet end at the extremity of the pin and spaced from the axis of the pin a distance in excess of the axis of said locking bolt, the oil cup or channel having an outlet at the side of the pin, and a cap or nut threaded upon the pin and provided with an opening spaced from the axis of the cap or nut a distance equal to the interval between the axis of the pin and the center of the locking bolt, whereby when the cap or nut is turned to open communication between the opening therein and the oil cup or channel only a portion of the inlet end of the oil cup or channel contiguous to the axis of the pin is exposed, substantially as specified.

5. The combination of a journal-pin provided with an eccentric locking bolt adapted to move parallel with the axis of the pin, a cap or nut threaded upon the extremity of the pin and provided with an opening accessible from the outer side of the cap or nut for engagement by the locking bolt, said cap or nut being further provided with countersunk sockets or depressions, and a wrench provided with studs to engage said countersunk openings or depressions, and a repressing pin of greater length than said studs and adapted to be inserted through said opening in the cap or nut to repress the locking bolt and hold it out of engagement with the opening during the rotation of the cap or nut, substantially as specified.

In testimony that I claim the foregoing as my own I have hereto affixed my signature in the presence of two witnesses.

EDWARD O. BRYDEN.

Witnesses:
E. A. GREENLEE,
W. H. CAULKINS.